(12) United States Patent
Aguren (10) Patent No.: US 8,260,132 B2
(45) Date of Patent: Sep. 4, 2012

(54) SYSTEM AND METHOD FOR CABLE MONITORING

(75) Inventor: Jerry G. Aguren, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 11/728,485

(22) Filed: Mar. 26, 2007

(65) Prior Publication Data

US 2008/0240724 A1    Oct. 2, 2008

(51) Int. Cl.
*H04B 10/08* (2006.01)
*H04B 10/00* (2006.01)

(52) U.S. Cl. ............... 398/28; 398/13; 398/20; 398/22; 398/139

(58) Field of Classification Search ............... 398/22, 398/23, 24, 13, 20, 21, 25, 28, 33, 135, 136, 398/138, 139, 9; 356/73.1; 385/12, 53, 60, 385/88
See application file for complete search history.

(56) References Cited

U.S. PATENT DOCUMENTS

| 5,703,682 | A  | * | 12/1997 | Eslambolchi ............... 356/73.1 |
| 6,817,522 | B2 |   | 11/2004 | Brignone |
| 6,968,994 | B1 | * | 11/2005 | Ashwood Smith ........... 235/375 |
| 7,120,324 | B2 | * | 10/2006 | Murphy et al. ................ 385/12 |
| 7,242,862 | B2 | * | 7/2007  | Saunders et al. ............... 398/30 |
| 2005/0232635 | A1 |   | 10/2005 | Aronson et al. |
| 2008/0031620 | A1 | * | 2/2008  | Hudgins et al. ................ 398/9 |
| 2008/0100456 | A1 |   | 5/2008  | Downie et al. |
| 2008/0100467 | A1 | * | 5/2008  | Downie et al. ............ 340/686.2 |

FOREIGN PATENT DOCUMENTS

WO    2008076235    6/2008

* cited by examiner

*Primary Examiner* — Mohammad R Sedighian (57) ABSTRACT

Embodiments include methods, apparatus, and systems for cable monitoring. One embodiment includes a method that receives data from an optical transceiver coupled to a cable and a RFID (radio frequency identification) device mounted to the cable. The data from the optical transceiver and RFID device is used to determine an operational status of the cable.

20 Claims, 7 Drawing Sheets

| ID | Failure or Missing Element | Communication Chain |
|---|---|---|
| 1 | Missing Element: Cable does not have RFID tag. System only uses optical transmit and receive energy. Result: Lack of detail cable parameters reduces accuracy of monitoring and diagnosis but not prevent it. | Switch to Switch, HBA, Storage<br><br>SM1, SNMP1 → SW1 — TR1 — [CN1] — C1 — [CN2] — TR2 — SW2 → SM2, SNMP2 |

| ID | Failure or Missing Element | Communication Chain |
|---|---|---|
| 2 | Missing Element: Transceiver does not have embedded reader or software can not read data from transceiver Result: Some cable operation can be monitored. Data is gathered from working SFP's receiver | Switch to Switch, HBA, Storage<br><br>SM1, SNMP1 → SW1 — TR1 — CN1 — C1 — [CN2] — [TR2] — [SW2] → SM2, SNMP2 |

SYSTEM AND METHOD FOR CABLE MONITORING

BACKGROUND

Data centers house large numbers of electronic equipment, such as computers and storage devices. Such data centers can span from a single room to multiple floors of an entire building. Servers are often stacked in rack cabinets that are placed in rows forming corridors so technicians can access the rear of each cabinet. Mainframe computers and other storage devices are often placed near the servers and can occupy spaces as large as the racks themselves.

Data centers and other networking infrastructures have enormous numbers of cable and wires connecting various electronic equipment. Even though such facilities are highly organized, the number of cables interconnecting such equipment can be overwhelming. Installing, maintaining, and tracking cables and connections to equipment can be complex. For instance, technicians need to know which cable connects to which piece of equipment. Further, if a cable becomes degraded or experiences a critical failure, then this cable needs to be readily identified.

In order to effectively manage a data center or other facility with large amounts of electronic equipment, sufficient information about cables, connections, and electronic equipment is required.

DETAILED DESCRIPTION

Embodiments in accordance with the present invention are directed to apparatus, systems, and methods for real-time monitoring of fiber channel cables in a data center. One embodiment calculates the operational condition of fiber channel cable during use. The method is adaptive and determines a status of a cable. This status can be determined using a minimal set of data acquired from only one end of a SFP (Small Form-factor Pluggable). The status can also be determined using much more information, such as a comprehensive set of system information that includes SFP transceiver and embedded RFID (Radio Frequency Identification) tag data acquired at both ends of a cable.

One exemplary embodiment requires a minimal of one side of a fiber channel cable to have a RFID reader and cable with RFID tags or transmitters. Information from the RFID tag along with data from the SFP provides data for in-depth and real-time monitoring, diagnosing, and managing of the cable connection system. Embodiments can operate with input from only one side of the cable or input from the SFP and RFID tag on both sides of a connector. For instance, when data from one end of a fiber channel cable is available, then the information includes one or more of the laser transmit current, laser transmit optical power, photodiode receiver optical energy, and the laser wavelength. In one embodiment, a central management application periodically polls the data. For example, the management application periodically (example, at predetermined intervals) monitors or queries the system to retrieve data from the optical transceiver and embedded RFID device.

One exemplary embodiment is a cable management system that includes four components: RFID tag, RFID reader, optical transceiver, and an algorithm. RFID tags are placed in or near the connectors located at each end of a fiber optic cable. One or more RFID readers are included, for instance one handheld RFID reader and one or more RFID readers embedded into SFP/SFF (Small Form factor Pluggable/Small Form Factor) optical transceivers. The final component is an algorithm that processes information collected from RFID tags and transceivers then determines cable status for all cables across the data center or network environment. In one exemplary embodiment, the status is presented to a user (example, as a report or output to a display) and provides an indication if a cable is properly or normally operating, operating in a degraded state, or failed.

The four components are combined to form different operational modes or system functions. By way of example, these functions include, but are not limited to, cable tracing, cable inventory, real-time cable monitoring, and diagnostics.

Exemplary embodiments enable IT (Information Technology) professionals the ability to instantaneously monitor the operational status of every cable in a data center or other computing or storage environment. Specifically, embodiments provide a framework that enables real-time cable monitoring, rapid diagnostics, accurate topology maps, and cable inventory generation of operational cables and cables in storage.

One exemplary embodiment monitors any cable type over the entire data center and operates at one or more different levels of accuracy. Further, embodiments do not require all subsystems of a system (example, data center) to be in place in order to provide cable status. As such, exemplary embodiments can operate without full integration.

The discussion of exemplary embodiments is divided into multiple sections below. These sections include RFID tags, RFID readers, embedded RFID readers, and monitoring and diagnostic systems and algorithms.

RFID Tags

RFID tags or identification devices provide information to manage cables in a data center or other environment with electronic equipment. This information includes a unique identifier or serial number in both connectors at each end of the cable. Moreover, the RFID tag contains detail cable parameters that are used by the monitoring and diagnostic algorithms and systems to determine the condition of the cable and the signal propagating down it.

RFID tags can be divided into two groups: active and passive. Active tags contain an energy source that allows the tag to continuously broadcast its signal. Passive tags do not have any power source, but instead depend on borrowing some of the energy in the incoming signal to power its own circuitry and to transmit its outgoing message.

One exemplary embodiment utilizes the passive circuit in the cable management system because of cost and size issues. For instance, small current passive RFIDs are positioned into connectors of the fiber channel cables.

RFID Readers

RFID readers can be utilized in exemplary embodiments in accordance with the present invention. A portable handheld reader, for instance, can have a working distance (i.e., the distance that reader can be energized to read tags) on the order of several meters.

The reader has two primary functions: tracing cable and conducting inventory. Many data centers or customer sites do not label the cables. Finding the end of a cable can be difficult, especially if there is an optical patch panel used at the facility. The handheld reader is used to store the unique serial number read from the tag in one connector. Then, by going to the patch panel or switch where the other end of the cable is suspected, the handheld reader is waved over the cable connectors. If a match to the RFID tag is found, the handheld reader makes a beep or a visual sign to notify the user that the connector has been found.

The next function is conducting inventory. This process includes both operational and non-operational cables. Non operational cables are cables not used in the system. They can be in boxes or bags and stored in cabinets. The handheld reader makes it easy to accurately capture the content of a RFID tag. The cable data stored in the reader is uploaded to a system management application for report generation. If an optical patch panel is used or if there are HBAs (Host Bus Adapters) or SFPs without embedded readers, then the handheld reader collects data and uploads this data to the system management application.

Embedded RFID Readers

In order to monitor and diagnose cables in operation, exemplary embodiments utilize methods and systems to automatically read the RFID tag at one or both ends of the cable. In one embodiment, the RFID reader is embedded in one or more of a SFP and/or SFF.

Figure 1:
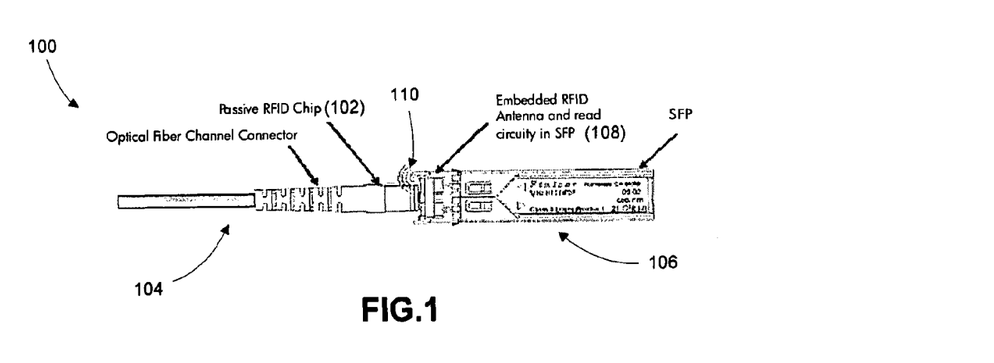
FIG. 1 is a block diagram showing an RFID tag mounted in a cable connector with an embedded RFID reader in accordance with an exemplary embodiment of the present invention.

FIG. 1 is a block diagram 100 showing how a RFID tag 102 mounted in a fiber channel cable connector 104 is read by an SFP 106 with an embedded RFID reader 108 that includes an antenna and read circuitry. Exemplary embodiments are thus able to monitor and diagnose a cable while the cable is operating (i.e., transmitting data). The semicircles 110 emanating from the RFID reader 108 represent radio waves from the reader to the RFID tag 102.

In one exemplary embodiment, the RFID tag contains a unique serial number for identifying both ends of the cable. The serial number is large enough to not have repeating numbers in the lifetime of cable manufacturing. In addition to the serial number, the manufacturer, length, connector type, and the physical parameters of the cable are included as well. Further, in one embodiment, data can be written to the RFID tag such that state information can stay with the cable when it is moved.

Various applications can be utilized with exemplary embodiments to support data collection across a data center using standards protocols such as SNMP (Simple Network Management Protocol) and SMI-S (Storage Management Initiative-Specification). In order to support reading SFP or RFID, data extensions are used to both SNMP and SMI-S protocols that include the RFID data in the cable and the detail transmitter and receiver optical power, and laser current, laser type, and laser mode from the transceiver.

Monitoring and Diagnostic Algorithms and Systems

In one exemplary embodiment, the cable RFID tags are not a mandatory requirement in order to provide some monitoring and diagnostics information across the data center. Optical transceivers and other types of connectors provide detail information like optical transmit power, optical receive power, laser current, and laser type. This information is available to the switch from many SFPs through a I2C (Inter-Integrated Circuit) interface.

In one exemplary embodiment, detail SFP data is provided over standard protocols like SNMP or SMI-S. To date, HBAs are more limited because only a few of the SFFs produce this detailed information. Once switch, HBA, and storage vendors support passing transceiver data over standard protocols, then the problem moves from data collection to algorithm development.

Figure 2:
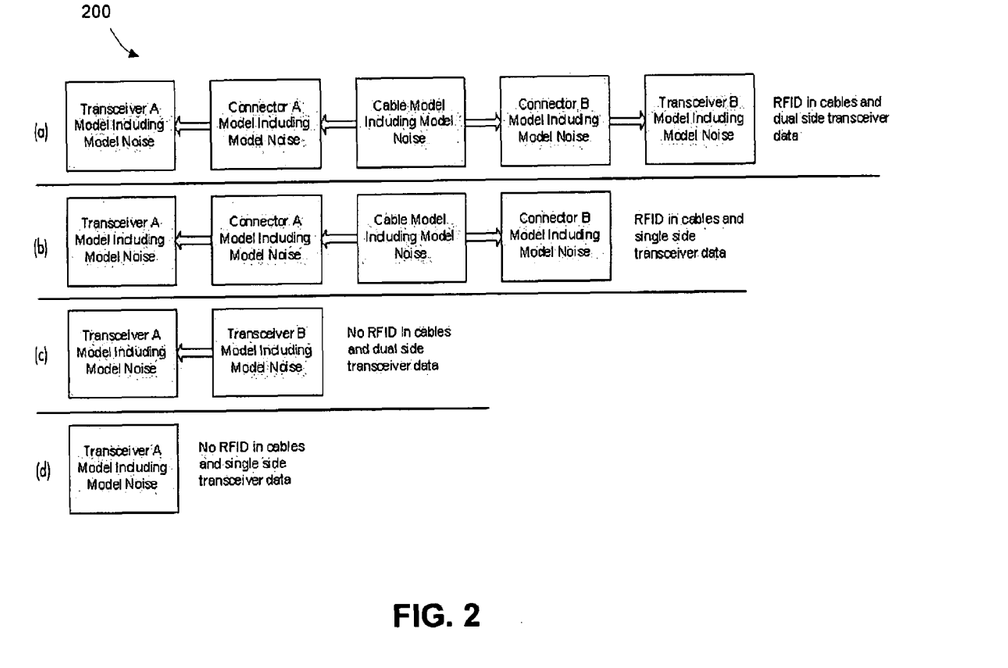
FIG. 2 shows four different model types with full to partial implementation of cable management in accordance with an exemplary embodiment of the present invention.

In one exemplary embodiment, determining the status of a cable requires more information that just RFID data about the cable and its connectors. The status of the SFP or SFF is analyzed as well. FIG. 2 illustrates four sceneries 200 that represent different levels of cable management support.

In FIG. 2, the blocks of portion (a) show a fully implemented subsystem that supports maximum accuracy in monitoring the cable and transceiver status. Both SFP/SFF data is read and both sides of the cable's RFID embedded tags are read and passed through to the switch through the SFP. Other block diagrams shown in FIG. 2 (i.e., blocks of portions (b), (c), and (d)) have missing elements from the complete system shown in (a). Even though these subsystems are incomplete, there is still enough data available to provide useful cable and transceiver status.

By way of example, blocks in (a) depict a full implementation of cable management system. Information is collected from both transceivers, and RFID tags are installed in connectors on both sides of the cable. The blocks in portion (b) are the same as (a) except one of the transceivers does not supply any information about the connector or itself. As shown in the blocks of portion (c), only SFP/SFF information is available and no RFID cable data is read. As shown in the blocks of portion (d), no cable data is available and only one side SFP data is available.

Figure 3:
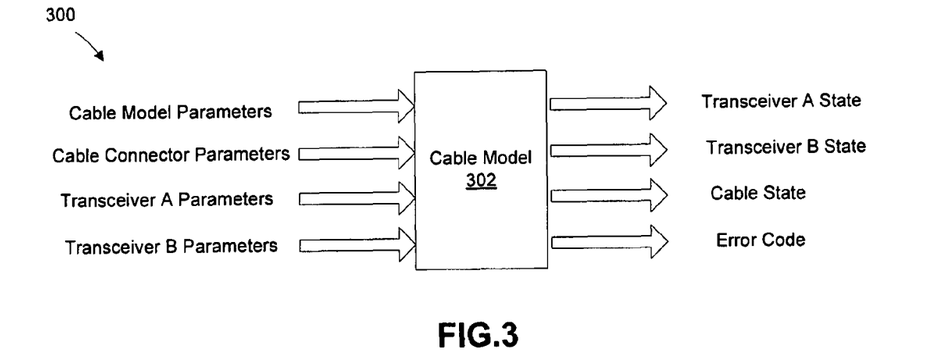
FIG. 3 shows inputs and outputs of a cable model in accordance with an exemplary embodiment of the present invention.

FIG. 3 shows inputs and outputs 300 of a cable model 302 in accordance with an exemplary embodiment of the present invention. This embodiment shows all of the input data and what the suggested output would look like to a monitoring or diagnostic cable algorithm. This data input and output are provided to determine the transceiver and cable status for a single cable. Each cable in the data center performs this calculation several times per day.

As noted, exemplary embodiments enable real-time monitoring and diagnosing of cables in operation. Having a RFID tag embedded in both connectors that are located at both ends of a cable supports several situations when the cable is under operation or stored state. In operation, the handheld reader is used to capture the serial number in cables that either do not have embedded readers in the transceivers or the other end of the cable is trying to be located or traced. Scanning all cable tags regardless if they are in storage or under operation is beneficial especially in situations where there are optical patch panels. The data in the handheld reader is then uploaded to application or database. Reports about the cables are then generated.

Figure 4A:
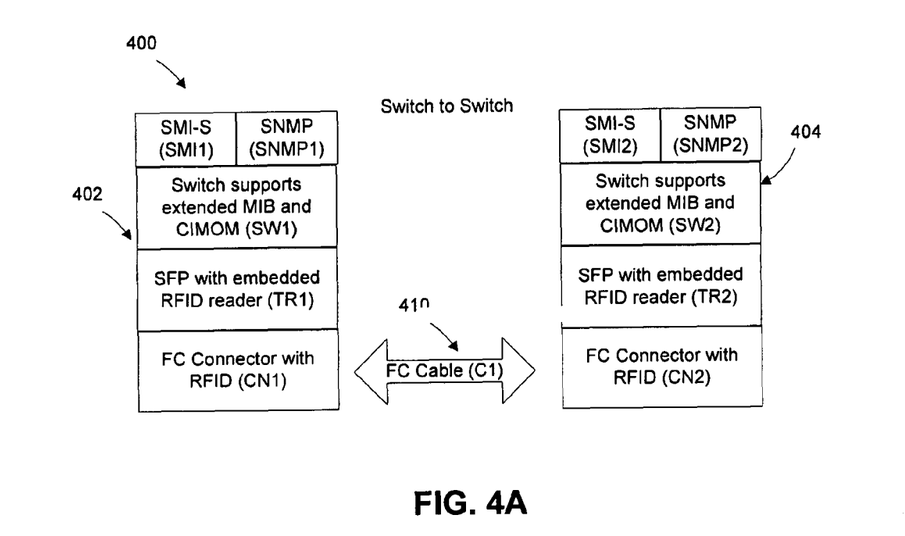
FIG. 4A shows a block diagram of a communication stack between two switches in accordance with an exemplary embodiment of the present invention.
Figure 4B:
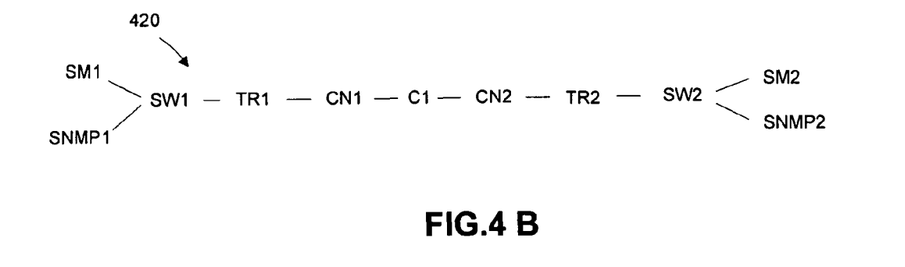
FIG. 4B shows a symbolic representation of the block diagram of FIG. 4A in accordance with an exemplary embodiment of the present invention.
Figure 5:
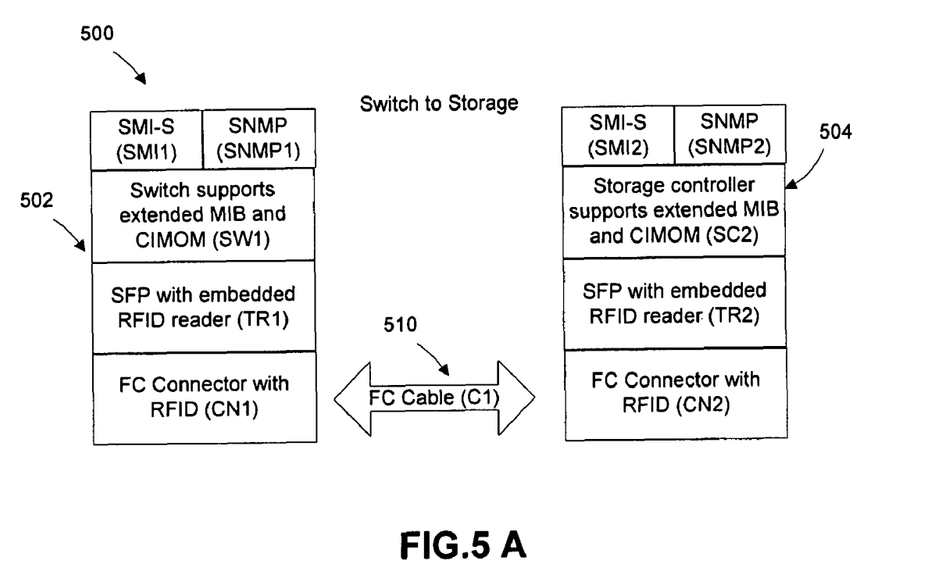
FIG. 5A shows a block diagram of a communication stack between a switch and a storage device in accordance with an exemplary embodiment of the present invention.
FIG. 5B shows a symbolic representation of the block diagram of FIG. 5A in accordance with an exemplary embodiment of the present invention.
Figure 6:
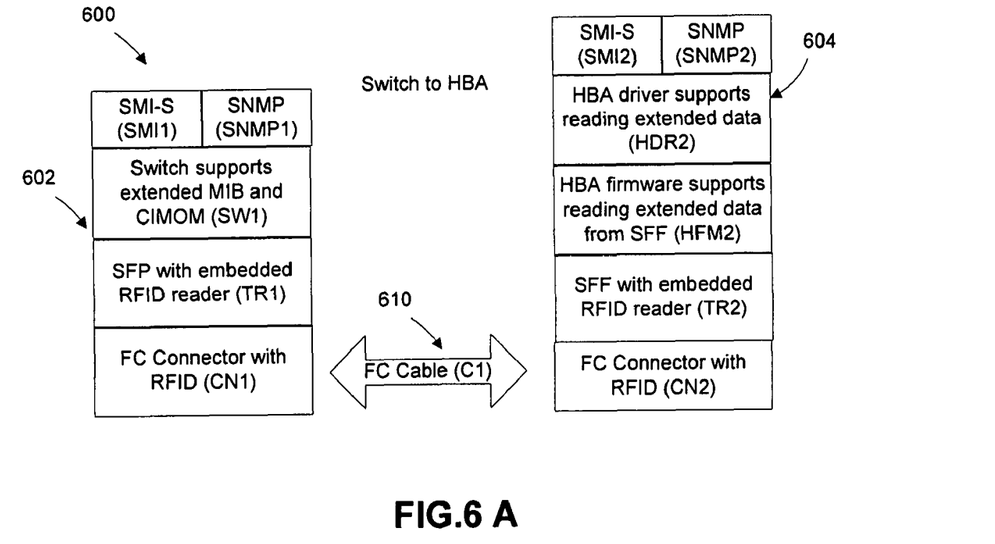
FIG. 6A shows a block diagram of a communication stack between a switch and HBA in accordance with an exemplary embodiment of the present invention.
FIG. 6B shows a symbolic representation of the block diagram of FIG. 6A in accordance with an exemplary embodiment of the present invention.

FIGS. 4 to 6 illustrate three exemplary communication scenarios that exist for the cable management system. These scenarios include switch-to-switch, switch-to-HBA, and switch-to-storage. Block diagrams are shown of the communication stack for each of the three conditions. Moreover, a symbolic representation is shown with the block diagram. The diagrams also depict native support of SNMP and SMI-S. Symbolic representation is used to efficiently illustrate what level of monitoring and diagnostics is achieved when elements in the communication stack have failed or missing.

By way of illustration, FIG. 4A shows a block diagram 400 of a communication stack between two switches 402 and 404 that are connected through a fiber channel cable 410. FIG. 4B shows a symbolic representation of the block diagram 420 of FIG. 4A. The RFID communication stacks support real-time monitoring.

As another example, FIG. 5A shows a block diagram 500 of a communication stack between a switch 502 and a storage device 504 connected through a fiber channel cable 510. FIG. 5B shows a symbolic representation of the block diagram 520 of FIG. 5A. The communication stack between a switch to storage device supports RFID real-time monitoring.

As another example, FIG. 6A shows a block diagram 600 of a communication stack between a switch 602 and HBA 604 connected through a fiber channel cable 610. FIG. 6B shows a symbolic representation of the block diagram 620 of FIG. 6A in accordance with an exemplary embodiment of the present invention. The communication stack between a switch and HBA supports RFID real-time monitoring.

Figure 7:
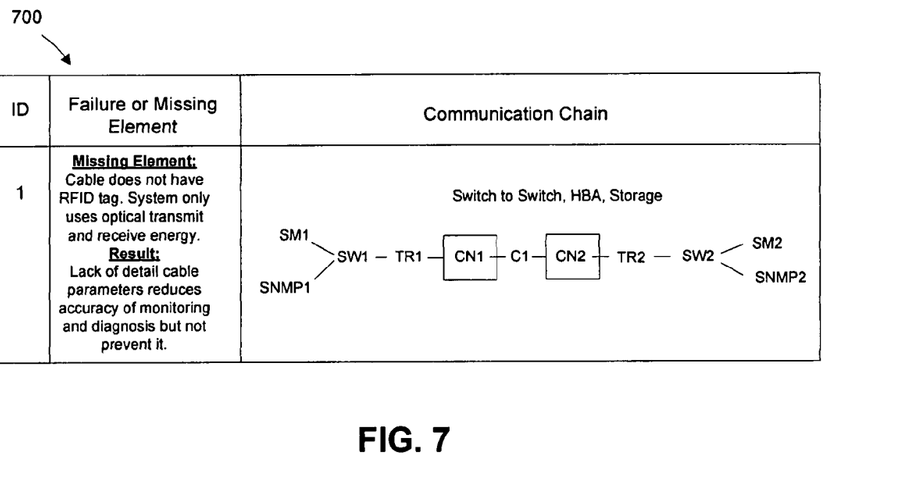
FIG. 7 shows a table of examples of failure scenarios and missing elements in accordance with an exemplary embodiment of the present invention.

FIG. 7 shows a table 700 of examples of failure scenarios and missing elements in accordance with an exemplary embodiment of the present invention. As shown, the cable does not have a RFID tag (the missing or failed elements represented by blocks around connector 1 (CN1) and connector 2 (CN2)). The system monitors uses of optical transmit and receive energy. The result is a lack of detail cable parameters reduces accuracy of monitoring and diagnostics but does not prevent such monitoring and diagnostics.

Figure 8:
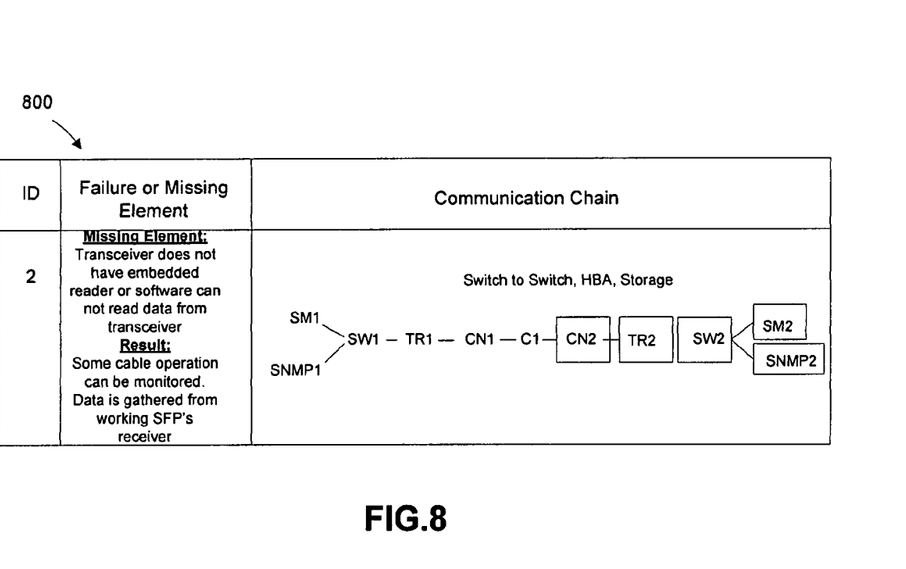
FIG. 8 shows another table of examples of failure scenarios and missing elements in accordance with an exemplary embodiment of the present invention.

FIG. 8 shows another table 800 of examples of failure scenarios and missing elements in accordance with an exemplary embodiment of the present invention. As shown, the transceiver does not have embedded reader or the software cannot read data from a transceiver on one side of the cable (the missing or failed elements represented by blocks around connector 2 (CN2), embedded reader 2 (TR2), switch 2 (SW2), SM2, and SNMP2). In spite of the failed or missing elements, some cable operation is still monitored. Data is gathered from the receiver of working SFPs.

Figure 9:
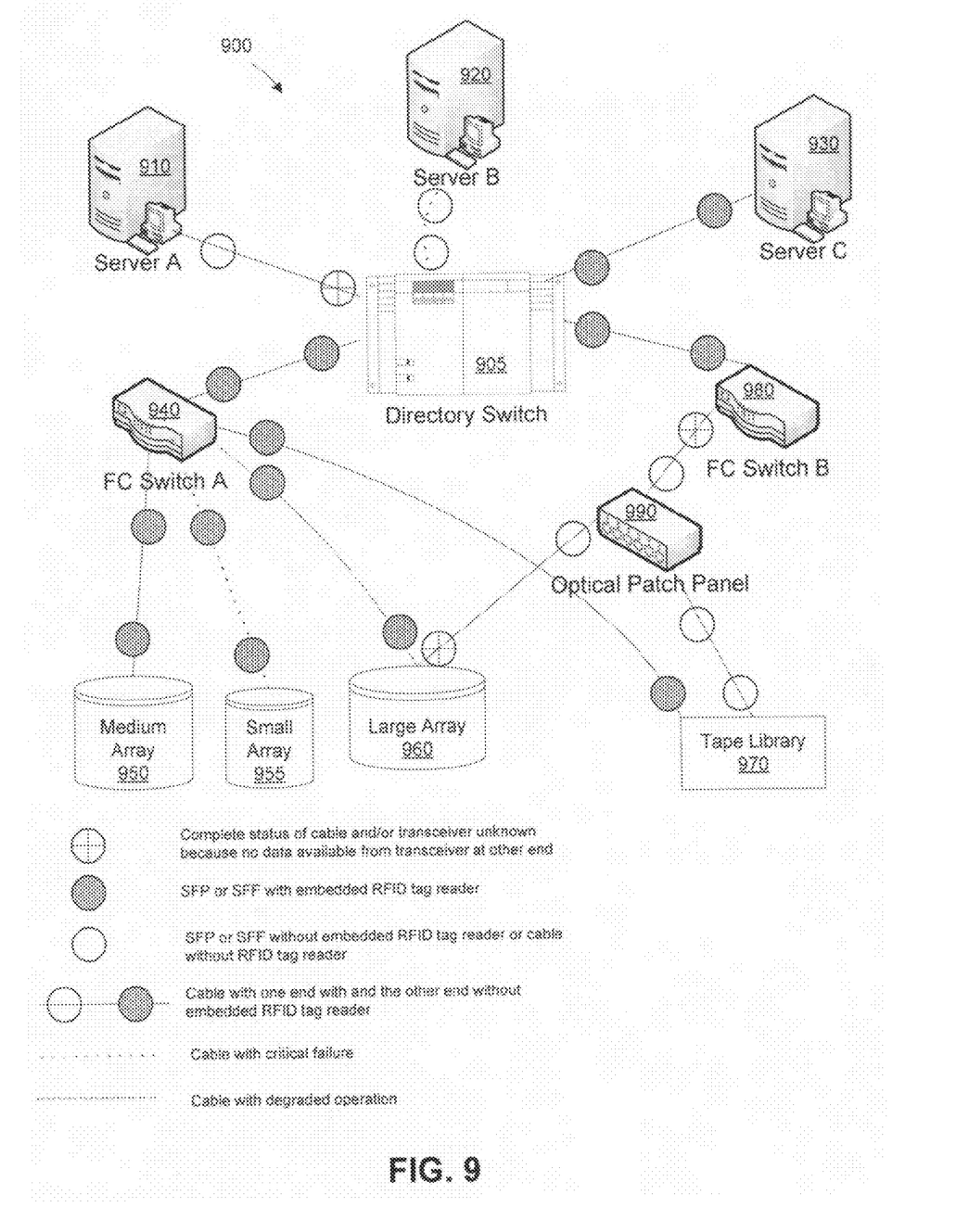
FIG. 9 shows an exemplary system in accordance with an exemplary embodiment of the present invention.

Exemplary embodiments of the cable monitoring architecture provide flexibility to adapt in operation. For instance, the system algorithms that monitor the entire data center can monitor and diagnose at its greatest accuracy when all cables have RFID tags and all Fiber Channel transceivers have embedded RFID readers. This condition is not necessary though for basic operation. For example, FIG. 9 illustrates a data center 900 that has a mix of cables with and without RFID tags and some SFF and SFP are without embedded RFID readers. This results in varied accuracy for individual cables across the data center. By way of example, in one embodiment, an algorithm assess the cable data and uses stochastic inference to determine an estimate of the cable and transceiver's operational condition.

By way of illustration, FIG. 9 includes a data center and has a director switch 905 that connects to various servers, switches, and storage devices. For example, director switch connects to server A 910, server B 920, server C 930, fiber channel switch A 940 (which connects to medium array 950, small array 955, and large array 960), tape library 970, fiber channel switch B 980, and optical patch panel 990. Various connections or communication pathways are shown with a dotted line (cable with a critical failure), dashed line (cable with degraded operation), and solid line (cable with normal operation, not faults or failures). Further, the connection status at each respective electronic device is indicated with one of a circle (SFP or SFF without embedded RFID tag reader or cable without RFID tag reader), solid or darkened circle (SFP or SFF with embedded RFID tag reader), and/or circle with lines or an "X" (complete status of cable and/or transceiver unknown because no data is available from transceiver at the other end).

The embodiment shown in FIG. 9 has some cables with and some cables without RFID tags and some devices without embedded RFID tag readers. Even in this varied environment, some inferences can be made about a cable status. The minimal requirement is one SFP or SFF reporting detail transceiver information at one end of a cable. The cable RFID is not required for the minimal configuration.

Figure 10:
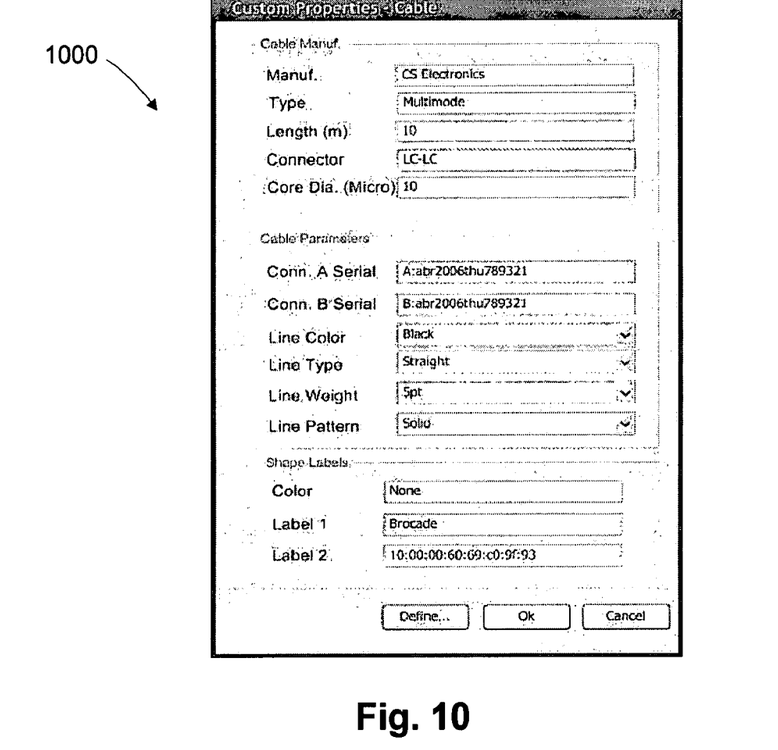
FIG. 10 shows an exemplary screenshot output of cable and transceiver data in accordance with an exemplary embodiment of the present invention.

FIG. 10 shows an exemplary screenshot output 1000 of cable and transceiver data in accordance with an exemplary embodiment of the present invention. The cable data along with transceiver data are used to determine the status of the fiber optic cable and SFPs and/or SFFs.

One exemplary embodiment places passive RFID tags at a specific location on the front of a server. Close proximity RFID readers are placed inside the rack door close to the hinge. Local controllers in each rack allow a complete data center inventory to be captured in only a few seconds. In one embodiment, the cable management system is designed to easily integrate with the server tracking system and other systems. This process includes uploading RFID cable data from the handheld reader. In addition, the serial numbers used with the cable RFID leverage the server tracking system identification scheme if applicable.

Figure 11:
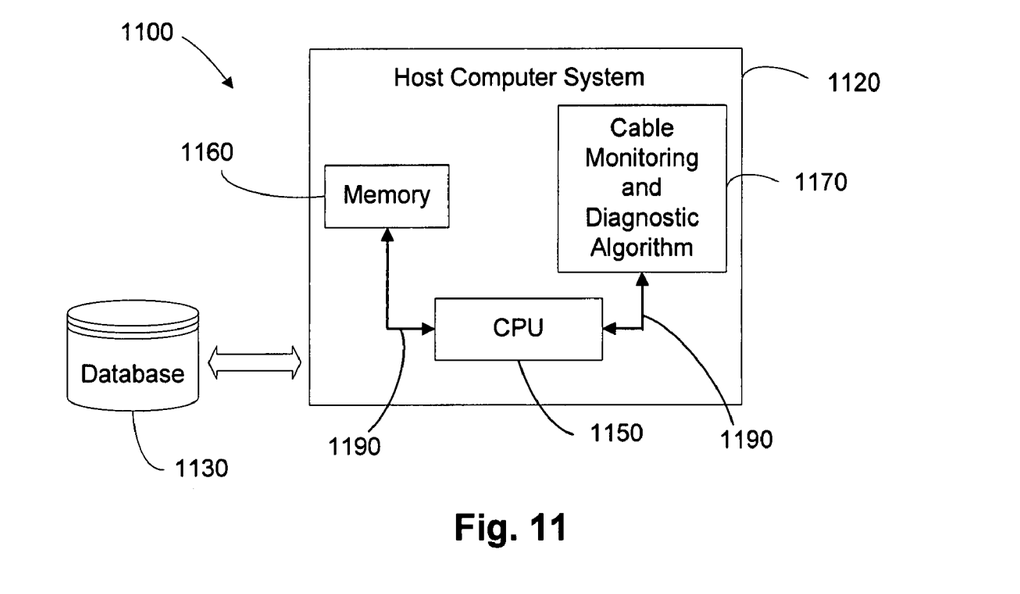
FIG. 11 shows an exemplary computer system in accordance with an exemplary embodiment of the present invention.

FIG. 11 illustrates an exemplary system 1100 for calculating the operational condition of a fiber channel cable system during use. The system 1100 includes a host computer system 1120 and a repository, warehouse, or database 1130. The host computer system 1120 comprises a processing unit 1150 (such as one or more processors of central processing units, CPUs) for controlling the overall operation of memory 1160 (such as random access memory (RAM) for temporary data storage and read only memory (ROM) for permanent data storage) and a cable monitoring and diagnostic algorithm 1170 for monitoring in real-time fiber channel cables during operation or use of the cables. The algorithm provides an estimation of the overall operation status of one or more specific cables. By way of illustration, such operation status includes good/normal, degraded, and/or failed.

The memory 1160 stores data, control programs, and other data associate with the host computer system 1120. In some embodiments, the memory 1160 stores the cable monitoring and diagnostic algorithm 1170. The processing unit 1150 communicates with memory 1160, data base 1130, cable monitoring and diagnostic algorithm 1170, and many other components via buses 1190.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

As used herein, the term "storage device" means any data storage device capable of storing data including, but not limited to, one or more of a disk array, a disk drive, a tape drive, optical drive, a SCSI device, or a fiber channel device. Further, as used herein an "SFP" or "small form-factor pluggable" is an optical transceiver used in optical communications for telecommunication and/or data communications. SFPs interface network devices to fiber optic cable. Further, the term "real-time" means In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention. By way of example, exemplary embodiments can utilize one or more embodiments disclosed in U.S. Pat. No. 6,968,994 incorporated herein by reference.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   collecting, from an optical transceiver coupled to a cable, data that includes one of laser information and optical power information;
   receiving the data from the optical transceiver;
   reading, with a RFID (radio frequency identification) reader embedded in the optical transceiver, data from a RFID device attached to an end of the cable; and
   determining, with the data from the optical transceiver and the data from the RFID device, an operational status of the cable.

2. The method of claim 1, wherein the optical transceiver is a small form-factor pluggable and the RFID reader includes an antenna and read circuitry.

3. The method of claim 1 further comprising, monitoring the cable to receive the data from the optical transceiver while fiber optic transmissions are occurring through the cable.

4. The method of claim 1 further comprising, receiving data from a first optical transceiver and a first RFID device at one end of the cable and from a second optical transceiver and a second RFID device at a second end of the cable.

5. The method of claim 1 further comprising, periodically monitoring the cable to receive new data from the optical transceiver and the RFID device.

6. A method, comprising:
   reading, with a RFID (radio frequency identification) reader embedded in an optical transceiver, data from a RFID device attached to an end of a fiber optic cable when the end of the fiber optic cable is plugged into the optical transceiver;
   receiving data from both the optical transceiver and the RFID device; and
   determining, with the data from both the optical transceiver and the RFID device, an operational status of the cable, wherein the data includes laser transmit current, laser transmit optical power, and photodiode optical energy.

7. The method of claim 1 further comprising, providing the data from the optical transceiver over a standard protocol that includes one of SNMP (Simple Network Management Protocol) and SMI-S (Storage Management Initiative-Specification).

8. A computer readable medium having instructions for causing a computer to execute a method, comprising:
   reading, with a RFID (radio frequency identification) reader embedded in an optical transceiver, data from a RFID device attached to an end of a cable while the end of the cable is plugged into the optical transceiver;
   monitoring the cable to receive data from the optical transceiver coupled to the cable and the RFID device coupled to the cable, the data from the optical transceiver including one of laser information and optical power information; and diagnosing the data from both the optical transceiver and the RFID device to determine if the cable is properly functioning.

9. The computer readable medium of claim 8, wherein the data from the optical transceiver includes optical transmit power, optical receive power, laser current, and laser type.

10. The computer readable medium of claim 8 further comprising, obtaining the data from a first optical transceiver located at one end of the cable and a second optical transceiver located at another end of the cable.

11. The computer readable medium of claim 8 further comprising, obtaining the data from a first RFID device embedded at one end of the cable and a second RFID device embedded at another end of the cable.

12. The computer readable medium of claim 8 further comprising, collecting a first portion of the data from a first end of the cable and a second portion of the data from a second end of the cable.

13. The computer readable medium of claim 8, wherein the optical transceiver is a small form-factor pluggable.

14. The computer readable medium of claim 8 further comprising, transferring the data from the optical transceiver and the RFID device through a switch to a central management location.

15. The computer readable medium of claim 8 further comprising, using the data to determine if the cable is operating in a degraded condition.

16. A computer system, comprising:
a memory storing instructions; and
a processor executing the instructions to:
   receive data from a first small form-factor pluqgable (SFP) coupled to a cable, the data including at least one of laser information and optical power information;
   receive data from a first RFID (radio frequency identification) reader located in the first SFP, the first RFID reader reading a RFID device located at the end of the cable; and
   determine, with the data from the first SFP and the RFID device, an identity of the cable and whether if the cable is properly operating.

17. The computer system of claim 16, wherein the at least one of laser information and optical power information includes photodiode receiver optical energy and laser wavelength.

18. The computer system of claim 16, wherein the laser information includes laser current and laser type, and the optical power information includes optical transmit power and optical receive power.

19. The computer system of claim 16, wherein the processor further executes the instructions to receive data from a second SFP coupled to the cable and a second RFID reader coupled to the cable.

20. The computer system of claim 16, wherein the processor further executes the instructions to determine when the cable is operating in a degraded condition based on laser transmit power received from the first optical transceiver.

* * * * *

UNITED STATES PATENT AND TRADEMARK OFFICE
CERTIFICATE OF CORRECTION

PATENT NO. : 8,260,132 B2
APPLICATION NO. : 11/728485
DATED : September 4, 2012
INVENTOR(S) : Jerry G. Aguren Page 1 of 1

It is certified that error appears in the above-identified patent and that said Letters Patent is hereby corrected as shown below:

In column 10, line 4, in Claim 16, delete "pluqgable" and insert -- pluggable --, therefor.

In column 10, line 12, in Claim 16, after "whether" delete "if".

Signed and Sealed this
Fifth Day of February, 2013

Teresa Stanek Rea
*Acting Director of the United States Patent and Trademark Office*